C. A. HARP.
MOTOR CAR.
APPLICATION FILED DEC. 16, 1908.
946,855.
Patented Jan. 18, 1910.
2 SHEETS—SHEET 1.
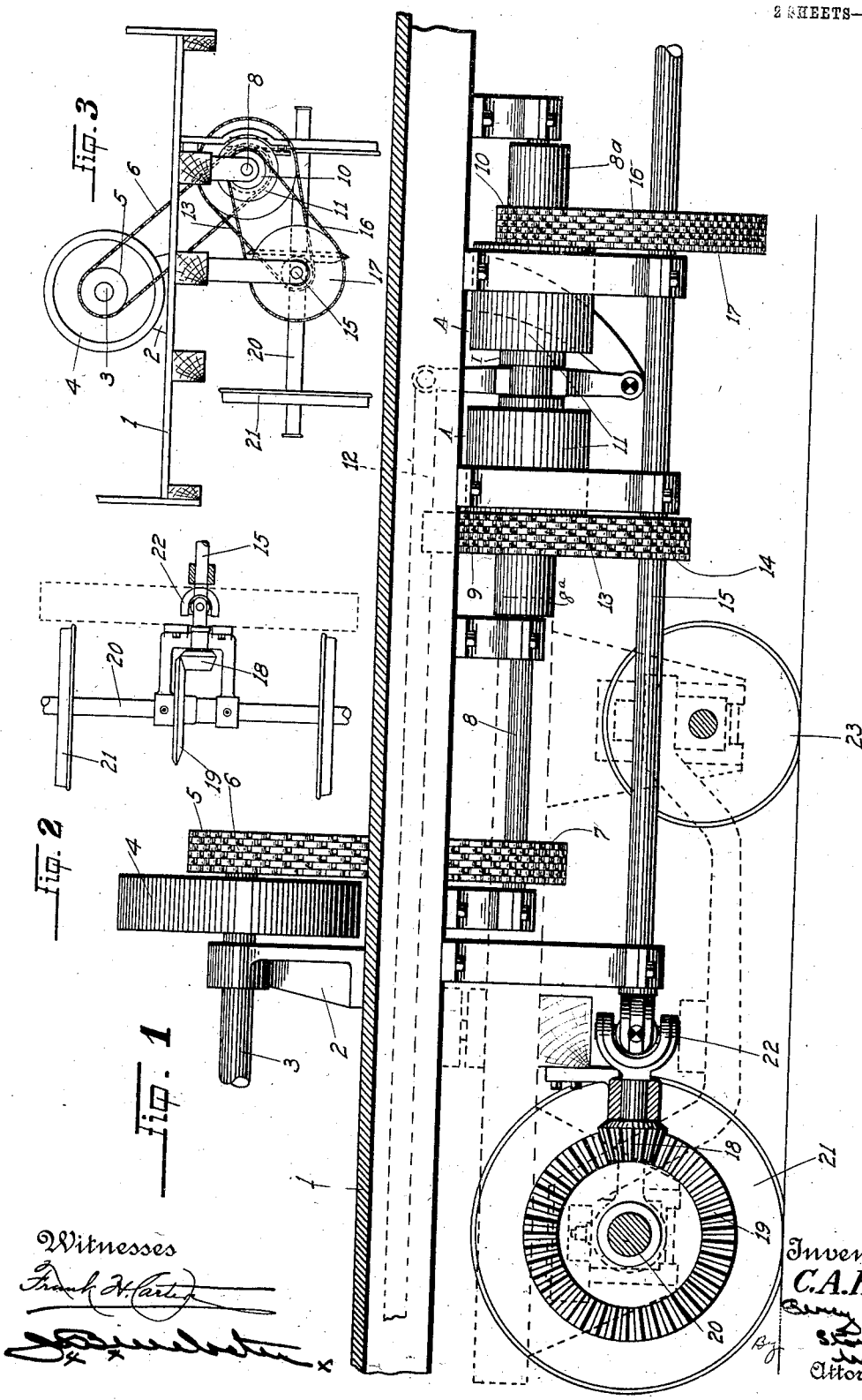
Witnesses
Inventor
C. A. Harp
Attorney

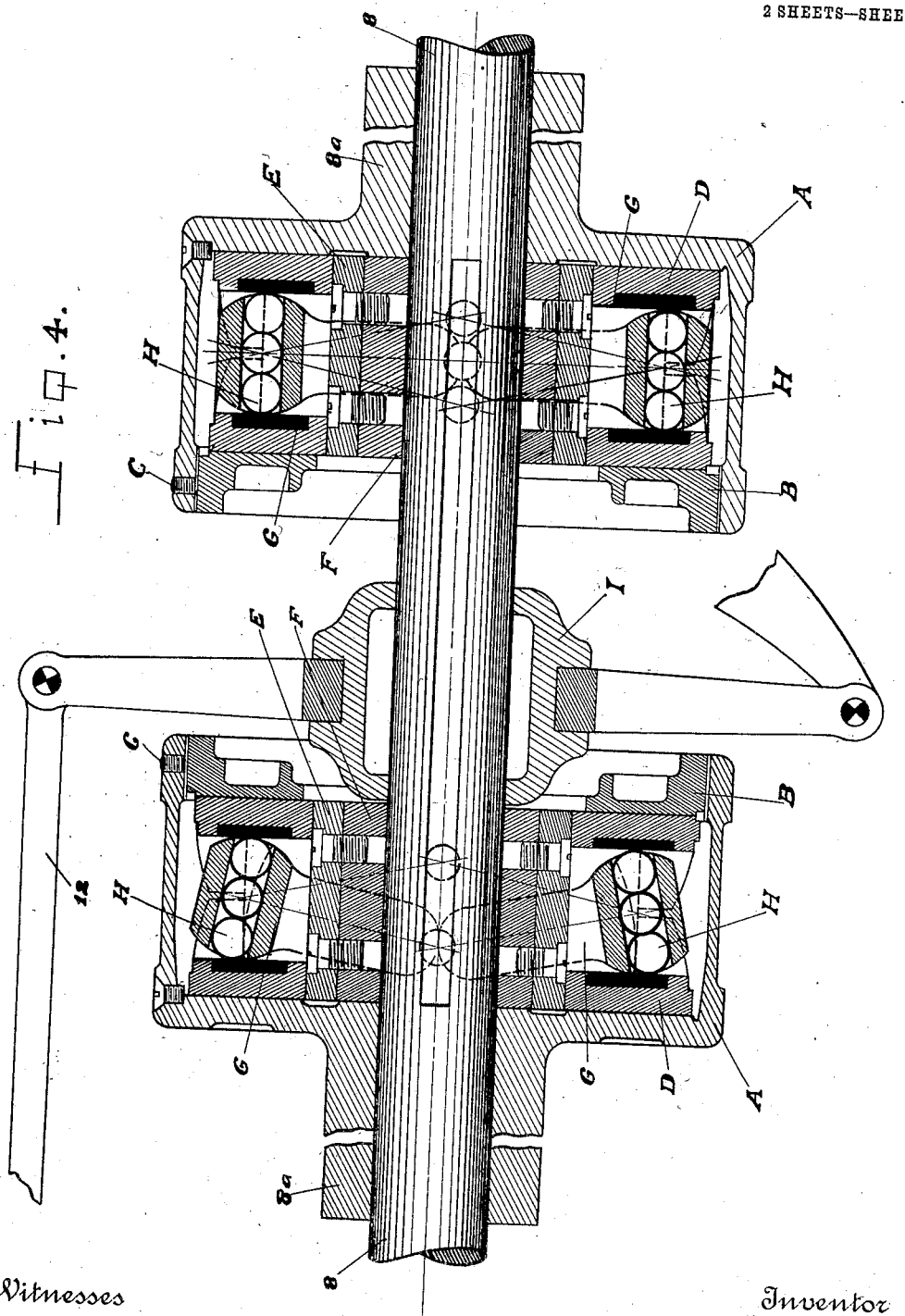

UNITED STATES PATENT OFFICE.

CHARLES A. HARP, OF SACRAMENTO, CALIFORNIA, ASSIGNOR TO HARP RAILWAY MOTOR CAR COMPANY, A CORPORATION.

MOTOR-CAR.

946,855.  Specification of Letters Patent.  Patented Jan. 18, 1910.

Application filed December 16, 1908. Serial No. 467,855.

*To all whom it may concern:*

Be it known that I, CHARLES A. HARP, a citizen of the United States, residing at Sacramento, in the county of Sacramento, State of California, have invented certain new and useful Improvements in Motor-Cars; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to the combination of parts which, when assembled, forms a complete device for the installation of gas, gasolene or alcohol power on any ordinary freight or passenger car for use on either a street, interurban or steam railroad car and with the power so produced and transmitted through the parts so assembled will propel and move said car on a railroad track at such speed as the motor or propelling power is designed to move said car. The object being to produce a motor car capable of traveling by the force of the power so produced, to be successfully started and stopped at the will of the operator gradually and without jars or jerks and without discomfort of passengers riding in said cars so propelled while the said gas, gasolene or alcohol engine is running at its normal speed; also that the power may be shifted from one gear to the other without discomfort or reducing the speed of the engine unless so desired.

A further object of the invention is to produce a combination of parts which, when assembled and installed on any ordinary car will make an effective, simple and inexpensive method of transporting freight and passengers over such aforementioned street, interurban or steam railroad, either utilizing equipment now constructed or to be constructed or to be especially constructed for the purpose of installing the combinations of parts thereon.

These objects I accomplish by means of a suitable gas, gasolene or alcohol engine (engine not shown) of suitable power placed inside the car on the floor of said car with the crank shaft of said engine placed longitudinally in the car. The power of said engine being transmitted from a sprocket on the engine crank shaft through a suitable silent running chain belt to a sprocket on a shaft located longitudinally with and beneath the sills of the car body. The last named shaft is sustained in place by suitable bearings fastened to the underside of the sills of said car body. Said last named shaft contains in addition to the sprocket aforementioned a double friction clutch of the multiple disk type. The clutch is so constructed that the ends containing the shifting mechanism face each other thus placing the sleeve of each clutch on the outer end. The device used to engage or disengage either side of the double clutch is controlled by one shifting lever. When the lever stands vertical both sides of the clutch are disengaged: thrown backward one side of the clutch is engaged and the other side runs idle on the journal: thrown forward to a vertical position both sides are disengaged: thrown forward the other side is engaged; back to vertical position again releases both sides.

On the sleeve of one side of the clutch is placed a small sprocket wheel of any sized diameter desired. On the sleeve of the other end of the double clutch is placed a larger sprocket wheel of any sized diameter desired. The power is transmitted to a main drive shaft from one or the other of the sprockets last above mentioned through a suitable silent running chain belt to sprockets on said main drive shaft. The size of said last named sprockets on said main drive shaft to be suitable for the service for which the motor is designed. The small sprocket on the sleeve of said clutch would be geared to the large sprocket on the main drive shaft and the large sprocket on the other clutch sleeve to the small sprocket on main drive shaft. When power and slow speed is desired the side of the double clutch containing the small sprocket would be engaged and when less power and more speed be desired the other side would be engaged. While one side of the clutch is engaged the other is running idle on the shaft.

The main drive shaft may be placed longitudinally under the body of the car so as to connect with the main drive shaft of any of the geared locomotives now in use on locomotives and other mechanical devices.

Independent of the geared trucks now in use I provide a truck with one pair of large wheels and one pair of small wheels. The bolster bearings of the car are set as near to the large wheels as practical so as to place as much of the weight of the car on the larger pair of wheels as possible to give the larger wheels as much tractive weight as possible, there being a bevel gear wheel of a diameter of any desired size placed on the axle of the larger pair of wheels with which a bevel pinion on the end section of the main drive shaft engages. For use on the above described truck the main drive shaft is placed directly in the middle of the car longitudinally and is sustained in suitable bearings fastened to the bottom of the sills of said car body. A universal joint is placed on each end of said main drive shaft and a short section on which the bevel pinion is placed, is fitted in suitable bearings in a cast frame suspended from the car axle and anchored to the bolster bearing on the car by a flexible device so as to permit the bevel wheel on the axle of larger wheels and the bevel pinion into which it meshes to work in harmony and to adjust itself to the movements of the trucks. The whole of which will more fully appear by a perusal of the following specifications and claim.

In the drawings similar characters of reference indicate corresponding parts in the several views.

Figure 1 is a fragmentary portion of one end of a car showing a side elevation of my improved running gear. Fig. 2 is a top plan view of the gear connection. Fig. 3 s a rear elevation of the running gear. Fig. 4 is a sectional view of a clutch.

Referring now more particularly to the characters of reference on the drawings 1 designates the body of the car on which is a journal support 2 in which is journaled the shaft 3 of the motive engine (engine not shown) on which shaft 3 is the fly wheel 4 and a sprocket wheel 5 connected by a silent chain 6 with a gear 7 on a shaft 8 journaled beneath the body of the car to one side of the center line of said shaft 3. On the shaft 8 are two sleeves 8ᵃ on one of which is a large sprocket gear 9 and on the other a small sprocket 10 the two being spaced apart and between which is disposed an alternating clutch mechanism 11 adapted to connect the motive power of the shaft 8 to one or the other of said gears, such clutch mechanism having a suitable operating lever 12 leading to the cab of the car. This clutch mechanism is a well known and used type but to add a clearer and more distinct understanding to my improved combination, I will herein describe the same briefly, viz:—
On the sleeve 8ᵃ and formed as a part thereof is a drum A. One head B of the drum A is separate and the clutch may be adjusted by this separate head which is screwed into the said drum A and secured therein by means of set screws C. Within the drum A are arranged two iron friction disks D which keys E, sunk into fixed or driving members F, force to rotate with the shaft 8. The disks D are free to move laterally on the keys E. The clutch depends for its power transmitting capacity upon the friction between friction disks D and the corresponding friction surfaces of the drum A and cover B. The clutch is engaged by forcing apart the friction disks D into contact with the drum heads by means of a toggle mechanism consisting of two forked levers G with holes through them, in which are lodged hardened and ground tool steel rollers H. When the levers G are brought, by means of the shifter ring I operated by the rod 12, to a plane perpendicular to the shaft, the line of the centers of the three rollers is perpendicular to the faces of the friction disks and the latter are pressed into contact with the friction disks with immense force. The advantage and adaptation of the use of this clutch in my improved combination has been fully enlarged upon in the preamble to the specification, hence no further mention need be made here, since the description here given is simply to aid in the understanding of the operation of my improved gear.

The large gear 9 is connected by a silent chain 13 with a small gear 14 on a shaft 15 journaled centrally beneath the car and the small gear 10 is connected by a silent chain 16 with a large gear 17 on the shaft 15. On each end of the car, the shaft 15 is provided with a bevel gear 18 intermeshing with a bevel gear 19 on the axle 20 of the large wheels 21, there being a universal joint 22 in the shaft 15 just to the rear of each gear 18 to permit the wheels 21 to make the necessary curves and turns without disengaging the gears 18 from the gears 19. The wheels 21 are the front wheels of each truck and are large and adapted to maintain the main weight of the car to make a greater traction means, the second set of wheels 23 being very much smaller for the purpose.

In operation the clutch 11 is operated to throw the power into the gear 9 to give a high speed to the gear 14 and incidentally the wheels 21, or into the gear 10 to give a low speed to the gear 17 and incidentally the wheels 21.

The whole combination above described is designed to give the most traction power possible to the car and still have a simple and easily operated running gear for the purpose.

From the foregoing description it will be readily seen that I have produced a running gear for motor cars which substantially fulfils the objects of the invention.

While this specification sets forth in detail the present and preferred embodiment of my invention, still in practice such deviations from such detail may be resorted to as do not form a departure from the spirit of the invention.

Having thus described my invention what I claim as new and useful and desire to secure by Letters Patent is:—

The herein described device comprising the combination with a car of a driving shaft, a second shaft, a gear on said first shaft, a gear on said second shaft, a chain connecting said gears, two sleeves on said second named shaft spaced apart, a large gear on one sleeve, a small gear on the other, a clutch disposed intermediate of said sleeves, means for connecting said clutch alternately with said sleeves, a third shaft, a large gear and a small gear on said third shaft, a chain connecting the large gear on said sleeves with the small gear on said third shaft, a chain connecting the small gear on said sleeve with the large gear on said third shaft, a universal joint in said third shaft, a beveled gear on the end of said third shaft, and means connecting said beveled gear with the driving wheels of said car.

In testimony whereof I affix my signature in presence of two witnesses.

CHARLES A. HARP.

Witnesses:
PERCY S. WEBSTER,
JOSHUA B. WEBSTER.